(12) United States Patent
Muylaert et al.

(10) Patent No.: US 7,034,246 B2
(45) Date of Patent: Apr. 25, 2006

(54) SELECTIVE LASER SINTERING REDUCED VOLUME FEED MECHANISM

(75) Inventors: Neal W. Muylaert, Apache Jct., AZ (US); Steven C. Low, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 72 days.

(21) Appl. No.: 10/915,643

(22) Filed: Aug. 10, 2004

(65) Prior Publication Data

US 2006/0032838 A1 Feb. 16, 2006

(51) Int. Cl.
*B23K 26/00* (2006.01)

(52) U.S. Cl. .............................. 219/121.6; 219/121.85

(58) Field of Classification Search ............ 219/121.6, 219/121.83, 121.85; 419/30, 35, 43; 266/216, 266/274; 425/174.4, 374; 264/497
See application file for complete search history.

(56) References Cited

U.S. PATENT DOCUMENTS

| | | | |
|---|---|---|---|
| 5,837,960 A | | 11/1998 | Lewis et al. |
| 6,046,426 A | | 4/2000 | Jeantette et al. |
| 6,531,086 B1 | | 3/2003 | Larsson |
| 6,589,471 B1 | | 7/2003 | Khoshnevis |
| 6,621,039 B1 * | | 9/2003 | Wang et al. ............. 219/121.6 |
| 6,815,636 B1 * | | 11/2004 | Chung et al. .......... 219/121.83 |
| 6,930,278 B1 * | | 8/2005 | Chung et al. .......... 219/121.85 |
| 2004/0084814 A1 * | | 5/2004 | Boyd et al. ................. 264/497 |

OTHER PUBLICATIONS

3D Systems, Inc., Accura DuraForm PA and GF Material, specification sheet, Feb. 2004, 2 pages, Valencia, CA.
3D Systems, Inc., 3D Systems Products Page, viewed on Aug. 5, 2004, 1 Internet page, Copyright 1997-2003.
3D Systems, Inc., 3D Systems Application Solutions, viewed on Aug. 5, 2004, 2 Internet pages, Copyright 1997-2003.
3D Systems, Inc., News Release, 3D Systems Providing Advanced Digital Manufacturing System to New Boeing Venture, 4 pages, Sep. 5, 2002, Valencia, CA.
Declaration of Steven C. Low Under 37 C.F.R. §132; Jan. 19, 2005; 2 pages.

* cited by examiner

*Primary Examiner*—Geoffrey S. Evans
(74) *Attorney, Agent, or Firm*—Thompson Coburn LLP

(57) ABSTRACT

A reduced feed mechanism for a selective laser sintering machine. The machine includes a powder feed source and a first feed piston to push powder from the source. The mechanism includes a spacer with an interior volume, a second piston, and a seal for the second piston. The spacer fits into the source. The first piston moves the second piston and causes powder to move from the interior volume. Preferably, the pistons are coupled by a floating coupling. An access panel may allow a user to view the coupling. The mechanism may include a ballast which can fit inside the source for the first piston. Preferably, the spacer reduces the volume of powder by approximately 70%. An infrared sensor may also be positioned to view the reduced amount of powder. Methods of selective laser sintering are also provided.

15 Claims, 5 Drawing Sheets

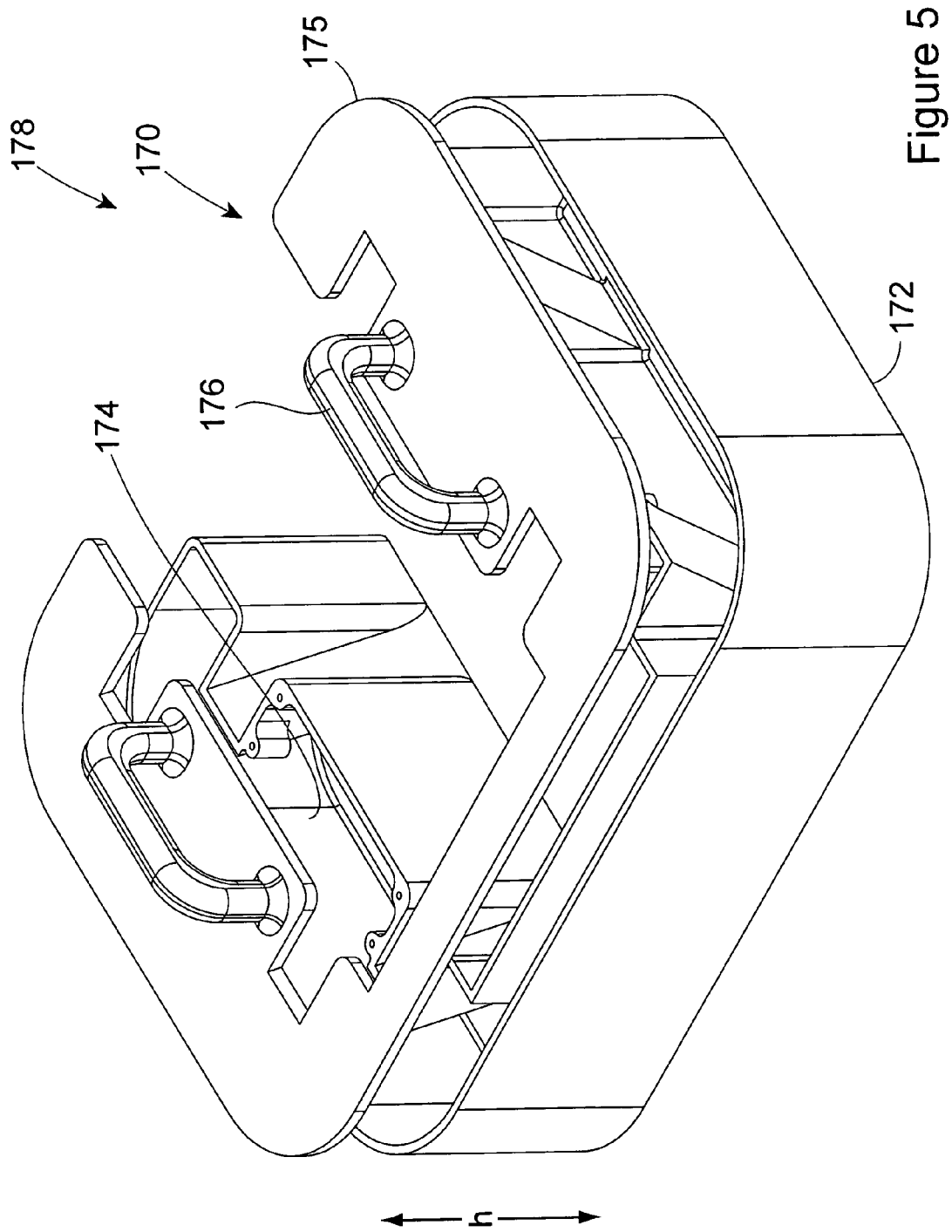

SELECTIVE LASER SINTERING REDUCED VOLUME FEED MECHANISM

FIELD OF THE INVENTION

This invention relates generally to selective laser sintering and, more particularly, methods and apparatus for increasing the efficiency of selective laser sintering machines.

BACKGROUND OF THE INVENTION

Rapid prototyping technology provides designers of complex parts a fast and flexible suite of tools with which to fabricate prototypes of their designs. The suite of tools also allows the designs to be moved to low initial production runs and to produce parts for testing. Stereolithography and selective laser sintering are among the most common commercial available rapid prototyping technologies. Both technologies allow a part to be fabricated layer-by-layer.

In the case of stereolithography, a vat is filled with a photosensitive polymer (e.g. a photopolymer) which solidifies upon being exposed to light of a suitable frequency and intensity to trigger the transformation. A laser is then traced along a path in the vat to define the initial (bottom most) layer of the object being fabricated. As the laser traces the path, the photopolymer solidifies to form that initial layer. The object is then lowered into the vat by a distance equal to the thickness of the initial layer and the process is repeated for subsequent layers of the object. When the last layer is complete, the object is removed from the vat and, if need be, cured. One drawback of stereolithography is that overhanging structures cannot be fabricated unless a support is positioned in the vat to support the initial layers of the overhanging structure. Alignment of the support and the laser thus becomes crucial to the successful fabrication of the object. Sterolithography is also limited by the selection of photopolymers (and hence the end materials) available to the designer.

Selective laser sintering, on the other hand, can be accomplished with a wide variety of materials including, but not limited to metals, cermets, ceramics, and many polymers. Like stereolithography, selective laser sintering allows an object to be fabricated layer-by-layer. Instead of the liquid photopolymer used for stereolithography, selective laser sintering uses a fine powder of the selected material. Initially, a layer of the powder is warmed to just below its melting point and distributed on a surface. Thereafter, a laser traces the initial layer of the object causing the granules in the powder to partially melt, fuse together, and re-solidify as the granules cool. The surface is lowered by the height of the layer and another layer of powder is applied to the previous layer. Then the process is repeated until the object is complete. The completed object is removed from, or broken out of, the powder that has accumulated on the surface (e.g. a piston sunk into the build deck of the selective laser sintering machine). Because a powder is used, that can support overhanging layers, selective laser sintering can be used to create overhanging structures. Additionally, the variety of materials that can be sintered allows the designer considerable latitude in the design of objects fabricated by selective laser sintering.

However, the properties, surface finish, and porosity of the completed object depend to a large extent on the size of the powder granules. Thus, the size of the granules must be controlled and is typically on the order of 50 microns. Impurities in the powder are likewise problematic because they can create voids, weak regions, or areas where corrosion can precipitate in the completed object. As a result, the powders are quite expensive. A need therefore exists to reduce the amount of powder used to create an object via selective laser sintering.

SUMMARY OF THE INVENTION

It is in view of the above problems that the present invention was developed. The invention provides methods and apparatus for increasing the efficiency of selective laser sintering.

In a preferred embodiment, the present invention provides a reduced feed mechanism for a selective laser sintering machine. The machine includes a powder feed source and a first feed piston to push powder from the source. The mechanism includes a spacer with an interior volume, a second piston, and a seal for the second piston. The spacer fits into the source. The first piston moves the second piston and causes powder to move from the interior volume. Preferably, the pistons are coupled by a floating coupling. An access panel may allow a user to view the coupling. The mechanism may include a ballast, which can fit inside the source, for the first piston. Preferably, the spacer reduces the volume of powder by approximately 70%. An infrared sensor may also be positioned to view the reduced amount of powder. Methods of selective laser sintering are also provided.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 5 illustrates a ballast for the reduced feed mechanism of FIG. 2.

DETAILED DESCRIPTION OF THE PREFERRED EMBODIMENTS

Figure 1:
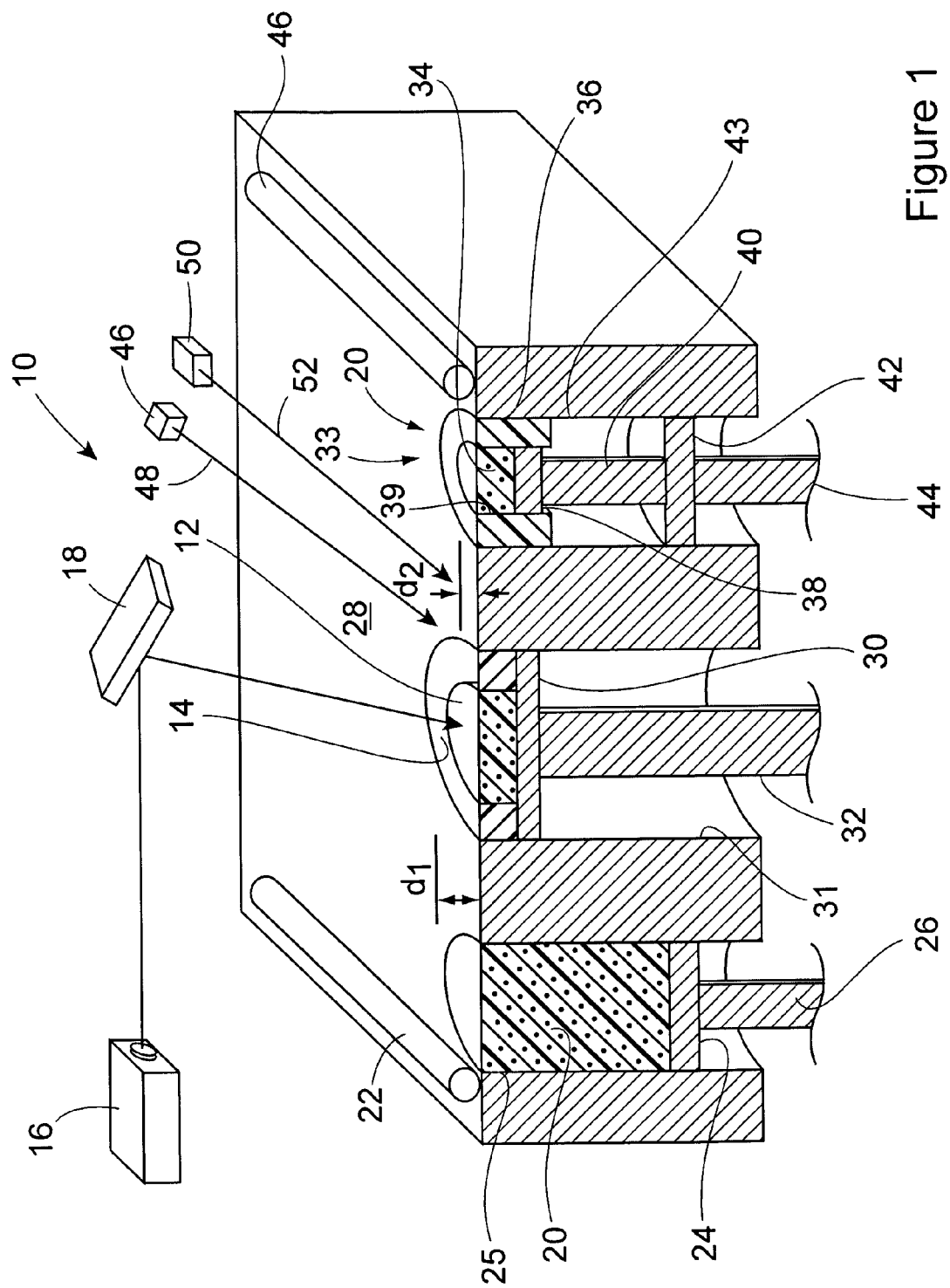
FIG. 1 illustrates a selective laser sintering machine constructed in accordance with the principles of the present invention.

Referring to the accompanying drawings in which like reference numbers indicate like elements, FIG. 1 illustrates a selective laser sintering machine constructed in accordance with the principles of the present invention.

The selective laser sintering machine 10 (of a preferred embodiment of the present invention) is shown fabricating an object 12, from a layer of powder 14. The machine 10 includes a laser 16, a mirror 18, a powder feed source 20, a roller 22, a feed piston 24, a feed ram 26, a surface or build deck 28, a build piston 30, and a build ram 32. The build deck 28 is flat and intersects with the cylinders 25 and 31, respectively, for the feed piston 24 and build piston 30. The roller 22 is shown at one side of the build deck 28 with the powder feed source 20 near the same end of the build deck 28. FIG. 1 also shows the build piston 30 generally centered in the build deck 28. The laser 16 and the mirror 18 are positioned above the build deck 28 so that the mirror 18 can direct the laser light onto the layer of powder 14 to sinter the granules of powder together.

In operation, the user of the machine 10 retracts the feed piston 24 using the ram 26 and fills the feed source 20 with fresh powder. The user then raises the piston 24 a distance selected to provide enough powder to create the layer of powder 14. This action causes the pre-selected amount of powder to rise above the surface of the build deck 28. Next, the operator advances the roller 22 over the feed source 20 and, eventually, over the build piston 30. Of course, the build piston 30 has been previously positioned so that it is below the surface of the build deck 28 by a distance equal to the desired thickness of the first layer 14 of the object 12. As the roller 22 advances it distributes the pre-selected amount of powder from the source 20 across the build piston 30 thereby creating the powder layer 14 on top of the build piston 30. Incidentally, a band of powder is also left on the surface of the build deck 28 that has a width d1 that is about equal to the diameter of the feed piston 24. After the layer 14 is created the roller 22 is then withdrawn.

Typically, a computer (not shown) then positions the mirror 18 to direct light from the laser 16 onto the powder layer 14 at an initial position for beginning the fabrication of the first layer of the object 12. The laser 16 is then activated and advanced (by the mirror) along a path selected to create the initial layer 14. When the initial layer 14 is complete the laser is turned off, the feed piston 26 raised again, and the roller 22 advanced. The process is repeated for each layer of the object 12 until the object is complete. Thereafter, the object 12 is broken out of the accumulated powder left on top of the build piston and allowed to cool.

The remaining powder on the build piston 30 and build deck 28 is then disposed of. In the alternative, the remaining powder may be collected for re-use. However, the used powder tends to react differently to the sintering process than fresh powder. This degradation occurs because the sintering process has exposed the remaining powder to temperatures close to the melting temperature of the powder. Thus, some granules may already be fused together while others may have accumulated impurities from the environment, or otherwise corroded, during the previous sintering cycle. Accordingly, the used powder is not favored for fabricating parts and will generally be discarded. Because the powder is expensive, discarding it drives up the price of the completed object 12. Further, because the used powder was heated, its disposal represents wasted energy. Likewise, the time required to initially heat the discarded powder represents a period during which the machine 10 could otherwise have been employed to fabricate another object 12.

Thus, the present invention provides methods and apparatus to reduce the amount of powder drawn from the source 20. Thus, the present invention increases the efficiency (in terms of powder, energy, cycle time, and cost) of the selective laser sintering process and machine 10. More particularly, FIG. 1 shows a reduced feed mechanism 33 of a preferred embodiment of the present invention. The reduced feed mechanism 33 is shown located in one of the feed sources 20 and includes a feed piston 42 and feed ram 44. In addition, the reduced feed mechanism 33 includes a spacer (or bore adaptor) 36, a reduced feed piston 38, and an associated ram 40. The reduced feed mechanism 33 also has a roller 46 associated with it. The spacer 36 fits into the cylinder 43 for the piston 42 and provides an upper surface that is flush with the surface of the build deck 28. The reduced feed piston 38 travels within a cylinder 39 defined by the entire wall of the spacer 36.

Further, the reduced feed piston 38 and ram 40 ride on top of the piston 42 so that when the piston 42 is raised the reduced feed piston 38 is raised by the same amount. Because the diameter d2 of the reduced feed piston 38 is smaller than the diameter d1 of the feed piston 42 less powder is provided to the roller 46 than would be the case if the reduced feed mechanism 33 were not used. Thus, less powder is distributed across the build deck 28, and the build piston 30, thereby reducing the amount of powder discarded after fabricating the object 12.

FIG. 1 also illustrates another modification desirable to optimize the performance of the machine 10 with the reduced feed mechanism 33 installed therein. The modification involves repositioning an infrared sensor 46 used to sense the temperature of the powder distributed by the roller 46 (and to control a heater to raise the temperature if necessary). Because the band of powder is narrower when the reduced feed mechanism 33 is in use, the infrared sensor may not be positioned to view the band. Thus, the sensor 46 may be repositioned to view the narrower band. As will be understood, brackets and other mounting hardware may be added to accommodate the sensor 46 in the new position. In the alternative an additional infrared sensor 50 may be provided at the new location.

Of course, the reduced feed mechanism 33 of the present invention may be provided by modifying an existing selective laser sintering machine 10. To accomplish the modification a spacer 36 may be fabricated to correspond to the shape and size of the cylinder 43 for an existing piston 42. The reduced feed piston 38 and the cylinder 39 for the reduced feed piston 38 may be sized to provide the appropriate amount of powder for the layers of a particular object 12. Preferably, the height of the spacer 36 (and cylinder 39) is sufficient to provide just enough powder to fabricate the entire object 12 and no more. Thus, the reduced feed mechanism 33 allows a standard machine 10 to be optimized for objects 12 that otherwise would be too small to economically fabricate on the machine 10. Note also that the reduced feed piston 38 need not be coupled to the piston 42. Rather, the reduced feed piston 38 (and ram 40) can merely ride on the piston 42. In another preferred embodiment, the sources 20 at the opposite ends of the machine 10 may include reduced feed mechanisms 33 of different diameters or heights. The current embodiment therefore allows the same machine 10 to be employed to fabricate objects 12 of many different sizes.

Figure 2:
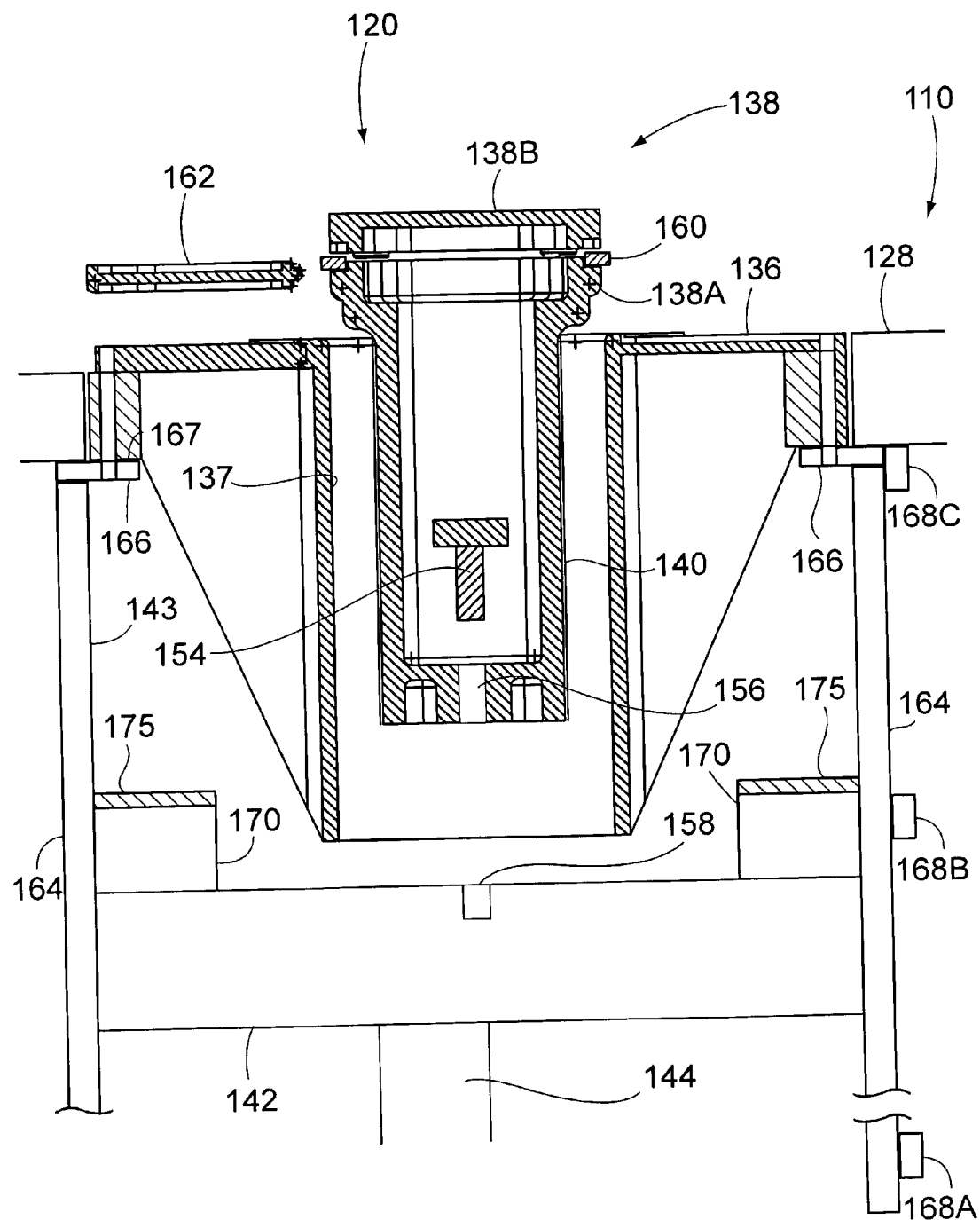
FIG. 2 illustrates a cross sectional view of a reduced feed mechanism for the selective laser sintering machine of FIG. 1.

Turning now to FIG. 2, another preferred embodiment of the present invention is illustrated. FIG. 2 differs from FIG. 1 in that FIG. 2 shows a preferred embodiment that is adapted for use with an SLS® 2000 selective laser sintering machine 110 (available from 3D Systems of Valencia, Calif.). While an SLS® 2000 is illustrated, the present embodiment could be adapted for use with any selective laser sintering machine (e.g. a SLS® 2500 or even a selective laser sintering machine from a source other than 3D Systems). In addition to the components previously discussed, FIG. 2 illustrates a floating coupling 154, two apertures 156 and 158, a seal 160, an access panel 162, an interface plate 166, and a feed bucket 164. The apertures 156 and 158 are formed, respectively, in the bottom of the ram 140 and the top of the piston 142. Together with the floating coupling 154, the apertures 156 and 158 couple the pistons 138 and 142 to each other. The seal 160 is positioned around the piston 140 to seal the gap between the cylinder 139 and the piston 138. The access panel is positioned on the top of the spacer 136 and positioned to allow the user to view the coupling 154 when the pistons 138 and 142 are coupled. The interface plate 166 positioned between the feed bucket 164 and the build deck 128, allows the reduced feed mechanism 133 to be installed in the machine 110.

The build deck 128, the piston 142, and ram 144 are part of the original, unmodified machine 110. Likewise, the feed bucket 162, which comes with the machine 110, corresponds to the source 20 shown in FIG. 1. The piston 138 and ram 140 may be formed as an integral piece part via selective laser sintering from, preferably, Accura® Duraform powder (also available from 3D Systems). Likewise, the other components of the reduced feed mechanism 133 may be produced by selective laser sintering.

To add the reduced feed mechanism 133 to the machine 110, the feed bucket 164 is jacked down, and away, from the bottom of the feed deck 128. The interface plate 166 is then position between the feed bucket 164 and the bottom of the build deck 128 and centered about the cylinder 143. The feed bucket 164 is then jacked back up toward the build deck 128 whereupon it traps the interface plate 166 between the top of the feed bucket 164 and the build deck 128. The spacer 136 is then inserted into the cylinder 143 so that a shoulder 167 of the spacer 136 rests on the interface plate 166 with the top surface of the spacer 136 flush with the top surface of the build deck 128. Of course, it is preferred that the circumferential gap between the spacer 136 and the build deck 128 be minimize to prevent powder from accumulating therein. The spacer 136 is then secured to the interface plate in any convenient fashion that, preferably, leaves the surface of the build deck 128 flat and unobstructed with respect to the motion of the roller (not shown).

The piston 138 and ram 140 are then inserted into the cylinder 139 so that the ram 140 rests on the piston 142. The floating coupling 154 is then placed in the interior of the piston 138 via an opening to be covered by the piston head 138B. The stem of the floating coupling 154 is advanced through the aperture 156 in the bottom of the ram 140 and threaded into the aperture 158 in the top of the piston 142. A clearance is provided between the floating coupling 154 and the sides of the aperture 156 so that the piston/ram 138/140 can be centered in the cylinder 139. In other words, the floating coupling 154 allows the piston 138 two degrees of freedom movement in addition to the direction of its stroke through the cylinder 137. The two degrees of freedom will be discussed further subsequently. Now that the reduced feed piston 138 is secured to the piston 142, the user can verify that the coupling 154 is properly installed. The user can do so by opening access panel 162 (shown removed from the spacer 136) and observing the coupling through the opening for the panel 162

Once satisfied that the coupling 154 has indeed properly secured the reduced feed piston 138 to the original piston 142, the seal 160 may be placed on the lower portion 138A of the piston 138. As shown, the seal 160 projects from the circumference of the reduced feed piston 138 so as to prevent powder from migrating to the volume beneath the spacer 136. Once the seal 160 is in place on the piston 138A, the piston head 138B is secured to the lower portion of the piston 138A. Preferably, the head 138B is secured by fasteners that leave the upper surface of the piston 138 flat and unobstructed. In this manner, the fasteners will not obstruct the motion of the roller when the piston 138 is at the operational top end of its stroke.

At this time, the piston 142 may be retracted thereby lowering piston 138 into the cylinder 139. Preferably, the piston 138 is lowered until the seal 160 is above, and in close proximity, to the lower end of the cylinder 139. The powder for the sintering operation is then poured into the cylinder 139 and the machine 110 readied for operation (i.e. powder heaters are turned on). Because the powder may be a metal (typically a stainless steel powder) heating the powder involves a temperature change of many hundreds of degrees Fahrenheit. Such a temperature excursion causes the various components to expand at rates depending upon the coefficients of thermal expansion of the materials from which the components are made. Consequently, it is preferred that the piston 138 be free to move relative to nearby components (e.g. the spacer 136, the piston 142, and the build deck 128). Otherwise, the stroke of the piston 138 (and piston 142) might be restrained by interference with these nearby components. Thus, the two degrees of freedom that the floating coupling 154 provides relieves the stress associated with the temperature change. Accordingly, the piston 138 and other components need not be fabricated from the same material.

Another feature of the current embodiment is shown in FIG. 2 along the right side of the feed bucket 164. Limit switches 168A and 168B define the allowable stroke of piston 142 and 138. If the reduced feed mechanism 133 is not installed the combination of limit switches 168A and 168C instead define the allowable stroke of the piston 142 (as with the original unmodified machine 110). If both sources 120 are equipped with mechanisms 133 having the same stroke, and limit switches 168A and 168B are installed for both mechanisms 133, the software for the machine 110 does not have to be modified (at least for the SLS® 2000 sintering machine 110 of the current embodiment).

Figure 3:
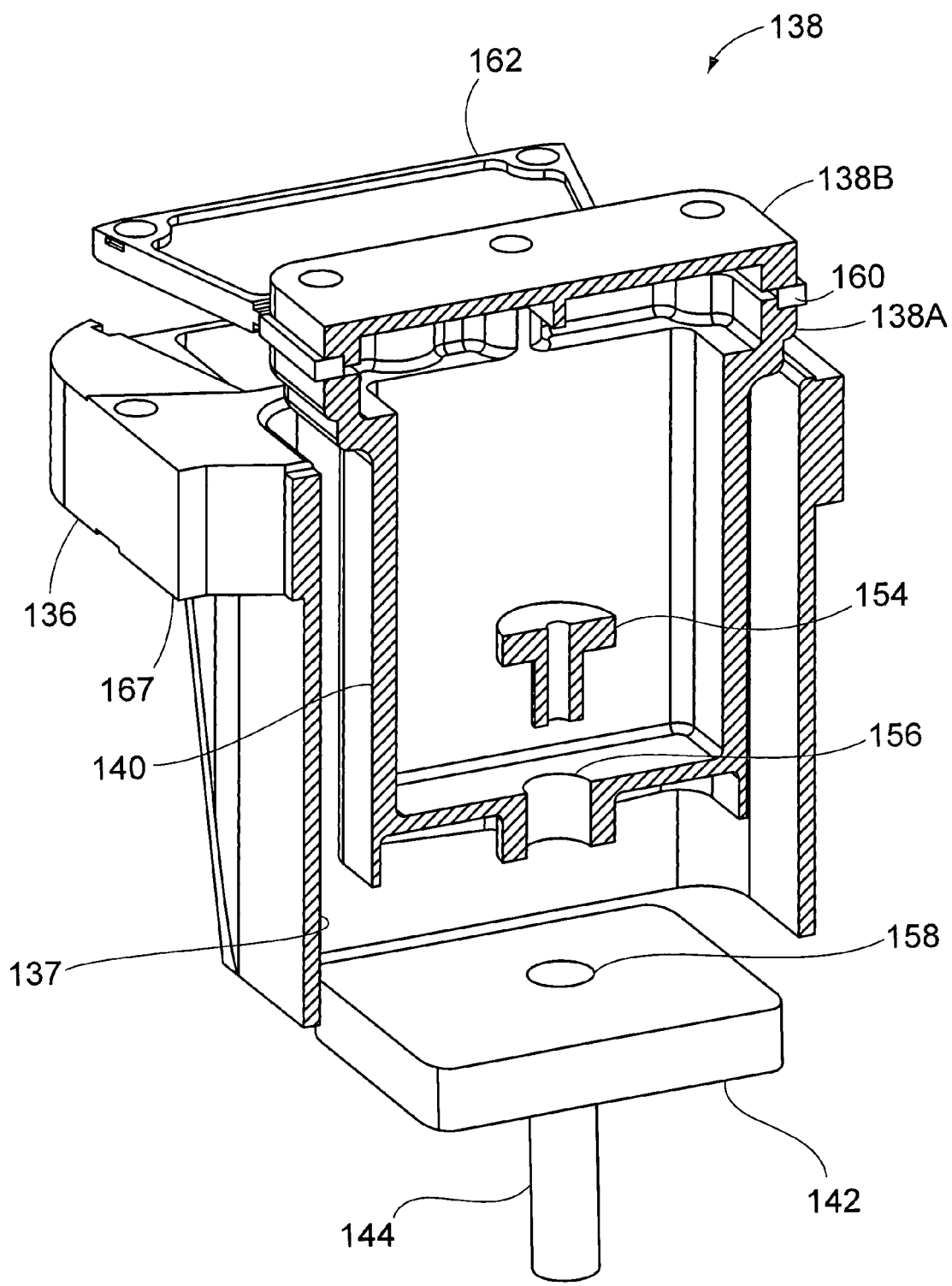
FIG. 3 is another cross sectional view of the mechanism of FIG. 2.

With reference now to FIGS. 5, another preferred embodiment of the present invention is shown. It has been found in operation that some sintering machines (e.g. the SLS® b 2000) have a latching mechanism associated with the ram 144 (see FIG. 4). If the ram 144 is restrained as it retracts (e.g. is being lowered) the latch will unlatch, thereby preventing further motion of the ram 144. Because the seal 160 (again see FIGS. 2 and 3) causes some friction with the walls of the cylinder 139, it is possible that the latch will become unlatched as the piston 138 is retracted. Thus, sintering operations are delayed while the latch is re-latched. Accordingly, the current embodiment includes a ballast 170, or weight, adapted for use with the reduced feed mechanism 133. The ballast 170 is adapted to ride on top of the piston 142 and offset the resistance to downward movement caused by the seal 160. In contrast to the ballast's function as the piston 142 is being lowered, the ballast 170 passively rides on the piston 142 as the piston 142 is being raised.

A lid 175 is also shown for the ballast 175. Preferably, the lid either rests on, or is secured to, the main body 172. The lid 175 also includes handles for lifting the lid 175 (and the main body 172) from the piston 142. An aperture 178 (see FIG. 5) may also be included to allow the ballast 170 to wrap around the lower portion of the spacer 136 (see FIG. 2). In addition, the height (h) of the ballast 170 may be selected so that the ballast 170 does not contact the spacer 136 near the end of the stroke of the piston 138. The ballast 170 also includes a body 172 with several sections 174 wherein a preferably dense material (e.g. stainless steel powder) can be added to the ballast 170. Thus, the overall weight of the ballast 170 may be adjusted to tailor the ballast 170 for a particular selective laser sintering machine.

Figure 4:
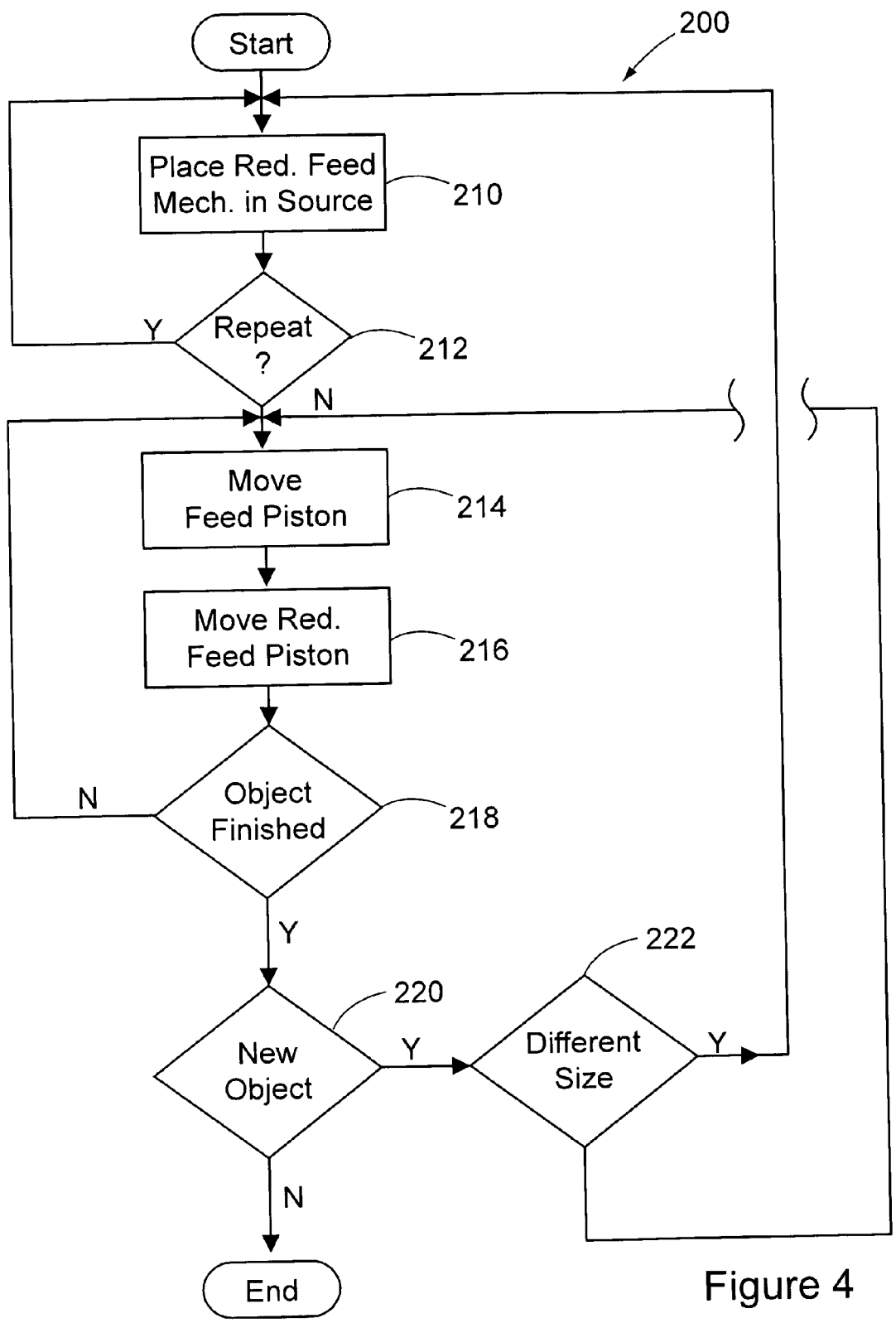
FIG. 4 illustrates a method in accordance with the principles of the present invention.

Turning now to FIG. 4, a method in accordance with another preferred embodiment of the present invention is illustrated. The method 200 generally includes installing a reduced feed mechanism(s) on a selective laser sintering machine, fabricating objects with the machine and the reduced feed mechanism, and (if desired) replacing one reduced feed mechanism with another. As shown, the method includes placing a reduced feed mechanism in a powder source of a sintering machine in operation 210. If another source on the machine is to be fitted with a reduced feed mechanism, the mechanism can also be installed as reference 212 indicates. Once the machine is ready for operation, the piston originally installed in the machine (e.g. piston 242 of FIGS. 2 and 3) is then raised. In turn the reduced feed piston moves up and provides the roller of the machine with a pre-selected (and reduced) measure of the powder. See operations 214 and 216 respectively. The layer-by-layer fabrication of the object continues until the object is complete as indicated by decision 218. If no other objects are to be fabricated the process ends at operation 220. If other objects are to be fabricated, then decision 222 is made as to whether it is desired to use a reduced feed mechanism with a different size than those currently installed on the machine. If so, the method returns to operation 210 where one of the current reduced feed mechanisms is replaced with a mechanism of the desired size. If the current mechanism is of a satisfactory size, then the method instead repeats from operation 214 where the fabrication process begins again. Of course, the reduced feed piston and cylinder may be sealed (e.g. by seal 160) during the fabrication process. As well, a ballast may be employed to prevent the unlatching of the original ram of the machine.

In view of the foregoing, it will be seen that the several advantages of the invention are achieved and attained. The present invention reduces the amount of powder used during selective laser sintering. Moreover, because less powder must be heated during the process, the energy and time required by the fabrication process are reduced. Additionally, the cycle times of the selective laser sintering machines are reduced because the present invention provides a way to avoid unlatching the ram of the original feed piston.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed Is:

1. An apparatus for use with a selective laser sintering device, the device including a powder feed source with a first interior volume and a first feed piston slidably engaged with the source and being capable of movement between a first position toward a first end of the source and a second position toward a second end of the source, a powder to be moved from the first volume when the first feed piston moves in a direction from the first position toward the second position, the apparatus comprising:
   a spacer having a second interior volume and adapted to fit into the first volume;
   a second feed piston having a circumference and slidably engaged with the spacer and being capable of movement between a third position toward a first end of the spacer and a fourth position toward a second end of the spacer when the first feed piston moves between the first position and the second position, the powder to be moved from the second volume when the second feed piston moves in a direction from the third position to the fourth position; and
   a seal around the circumference.

2. The apparatus according to claim 1, further comprising a coupling to couple the second feed piston to the first feed piston.

3. The apparatus according to claim 2, wherein the coupling is a floating coupling whereby the coupling allows the second feed piston to move in at least one direction in addition to a direction between the between the first position of the second feed piston and the second position of the second feed piston.

4. The apparatus according to claim 2, further comprising an access panel of the spacer positioned on the spacer to allow a user of the apparatus to remove the access panel from the spacer and observe at least the coupling.

5. The apparatus according to claim 1, further comprising a ballast adapted ride on the first piston.

6. The apparatus according to claim 5, the ballast further comprising being adapted to fit into the first interior volume.

7. The apparatus according to claim 1 wherein the second interior volume is approximately 30% of the first interior volume.

8. The apparatus according to claim 1 further comprising a bracket, the selective laser sintering device to include an infrared sensor originally positioned to sense the temperature of the powder after the powder has moved from the first interior volume, the bracket adapted to hold the infrared sensor in a position to sense the temperature of the powder after the powder has moved from the second interior volume.

9. A method of increasing the efficiency of a selective laser sintering device, the method comprising:
    using a spacer to space apart a first feed piston from a wall of a feed source of the selective laser sintering device, the spacer defining a first interior volume, the wall of the feed source defining a second interior volume;
    pushing the first feed piston at least partially through the first interior volume using a second feed piston, the second feed piston being a part of the selective laser sintering device, the pushing of the first feed piston causing a first portion of a powder in the first interior volume to move from the first interior volume, the first portion of powder being less than a second portion of powder that movement of the second feed piston through the second interior portion would have caused to move from the second interior volume if the powder had been in the second interior volume and in the absence of the spacer and first feed piston; and
    sealing the first feed piston and the spacer.

10. The method according to claim 9, further comprising ballasting the second piston.

11. The method according to claim 9, further comprising sensing the temperature of the first portion of the powder.

12. The method according to claim 9, further comprising coupling the first piston and the second piston.

13. The method according to claim 12, further comprising allowing the first piston to move relative to the second piston in a direction other than the direction of the pushing.

14. The method according to claim 12, further comprising observing the coupling.

15. The method according to claim 9, wherein the first portion of the powder is approximately 30% of the second portion of the powder.

* * * * *